United States Patent
Williams, Sr.

[11] 3,849,913
[45] Nov. 26, 1974

[54] DISPLAY MAP DEVICE FOR INDICATING THE EXTENT OF THE TRAVELS OF A MOTORIST

[76] Inventor: Bradford A. Williams, Sr., 8231 Driftwood Dr., Norfolk, Va. 23518

[22] Filed: Nov. 30, 1970

[21] Appl. No.: 93,541

[52] U.S. Cl. ................................. 35/42, 40/125 A
[51] Int. Cl. ........................................... G09b 29/00
[58] Field of Search .......... 35/42, 26, 27; 40/125 A; 161/1, 3, 6

[56] References Cited
UNITED STATES PATENTS

| | | | |
|---|---|---|---|
| 2,046,924 | 7/1936 | Pendergast | 40/125 A |
| 2,762,153 | 9/1956 | Knode | 35/26 X |
| 3,002,309 | 10/1961 | Snyder | 35/27 X |

FOREIGN PATENTS OR APPLICATIONS

| | | | |
|---|---|---|---|
| 1,169,834 | 11/1969 | Great Britain | 161/6 |

*Primary Examiner*—Jerome Schnall
*Attorney, Agent, or Firm*—J. Maxwell Carson, Jr.

[57] ABSTRACT

A display map device including a sheet of transparent material carrying an outline map depicting the border configuration of a nation or the like as well as the border configurations of political subdivisions thereof or the like. The face side of the map carrying sheet is coated with a transparent pressure sensitive adhesive initially protected by an overlying and adhering sheet of material readily detachable therefrom; the adhesive coating the face side of the map carrying sheet being utilizable when the sheet of protective material has been removed therefrom to mount the map carrying sheet on the interior surface of a motor vehicle window. The reverse side of the map carrying sheet, at least throughout the extent of the total area depicted by the map, is also coated with a transparent pressure sensitive adhesive initially protected by a plurality of overlying and adhering protective sheet elements each corresponding in shape, size, and positioning to one of the depicted subdivisions of the area depicted by the map; each of these protective sheet elements being separately replaceable by a corresponding sized and shaped display element formed of sheet material.

8 Claims, 5 Drawing Figures

PATENTED NOV 26 1974  3,849,913

INVENTOR.
BRADFORD A. WILLIAMS, SR.

BY J. Maxwell Carson, Jr.
ATTORNEY

DISPLAY MAP DEVICE FOR INDICATING THE EXTENT OF THE TRAVELS OF A MOTORIST

This invention relates generally to a display map device for indicating the extent of the travels of a motorist, and more particularly to an outline map printed on a sheet of transparent material having a face side attachable to the interior surface of one of the windows of an automobile and having a reverse side provided with means for attaching thereto elements to indicate the specific portions of the area covered by the map visited by the operator of the automobile.

Heretofore, motorists desirous of indicating on their automobiles the extent of their travels therein have found it necessary to purchase or to otherwise acquire display devices separately obtainable in various areas. Such presently available display devices usually are in the form of decalcomanias or the like on which, for instance, a small scale and rudimentary map of one of the States of the United States is printed, together with the name thereof and possibly other data pertinent thereto such as the motto, seal, flower, and/or bird thereof. A motorist who has visited a number of the States of the United States, for example, and has acquired such presently available display devices to indicate the full extent of his travels throughout the United States, will soon find that a considerable extent of the window space of his vehicle legally available for displaying such devices has been taken up by the same, leaving him little or no room to further add more devices of this type to his displayed collection thereof. This drawback of such prior art display devices is eliminated in the display map device according to the instant invention, which permits a motorist to display on a relatively small portion of the window area of his vehicle elements indicative of the extent of his travels, and which is also readily adapted to be utilized by an entity doing business, for example, throughout an entire country to promote the sale of its products through chains of retail outlets established in each of the political subdivisions thereof.

Accordingly, an object of the present invention is the provision of a device for displaying on a vehicle elements indicative of the extent of the travels of the operator thereof.

Another object of the instant invention is the provision of a display map device readily mountable on a window of a motor vehicle provided with means for attaching thereto elements indicative of the extent of the travels of the vehicle operator within the area covered by the display map device.

According to the present invention, the foregoing and other objects are obtained by providing a map printed in outline form on a base sheet of transparent material depicting the borders of a nation or the like as well as the borders of the political subdivisions thereof. The face side, or front surface, of the base sheet carrying the map is coated with a layer of pressure sensitive adhesive protected prior to mounting of the map device on the window of a motor vehicle by an overlying and adhering sheet of protective material readily detachable therefrom. The reverse side, or rear surface, of the base sheet carrying the map is also coated with a layer of pressure sensitive adhesive, and this layer of adhesive coating the rear surface of the base sheet carrying the map is also initially protected by overlying and adhering sheet material readily detachable therefrom so segmented that a separately detachable portion thereof overlies the rear surface of each portion of the area covered by the map defining the extent of one of the subdivisions thereof. Each separately detachable portion of the sheet material initially protecting the layer of adhesive coating the reverse side of the base sheet carrying the map may be individually replaced by a correspondingly sized and shaped element formed of a suitably colored and marked sheet material readily visible through the transparent base sheet carrying the map to an observer stationed externally of the motor vehicle; each of these elements being obtainable in the area thereby represented.

A more complete appreciation of the invention and many attendant advantages thereof will be readily apparent as the same becomes better understoOd by reference to the following detailed description thereof when considered in connection with the accompanying drawing wherein.

Figure 1:
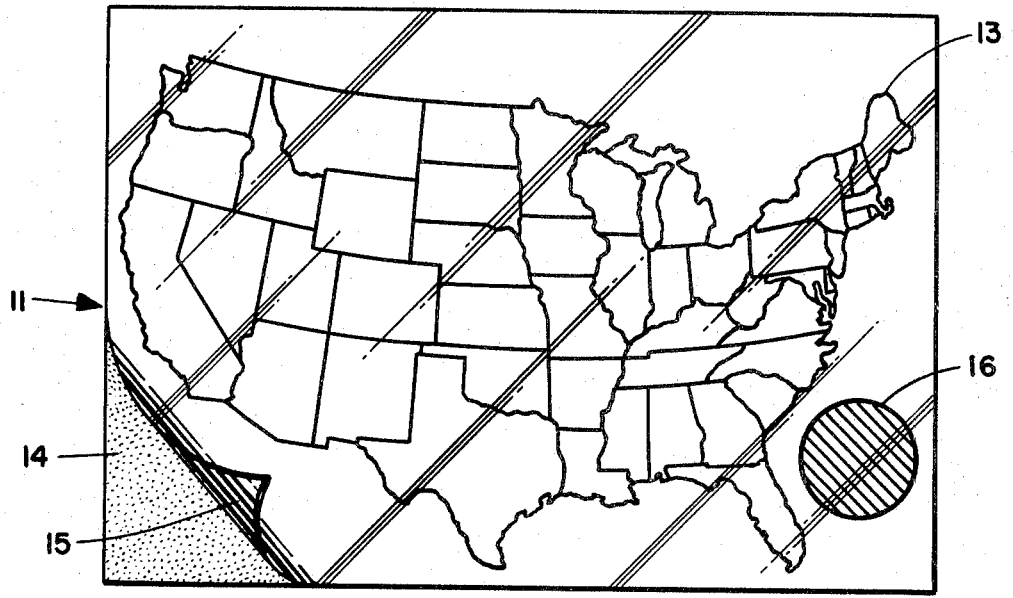
FIG. 1 is an elevational view of the front surface of the display map device according to the instant invention prior to the mounting thereof on a motor vehicle window.
Figure 2:
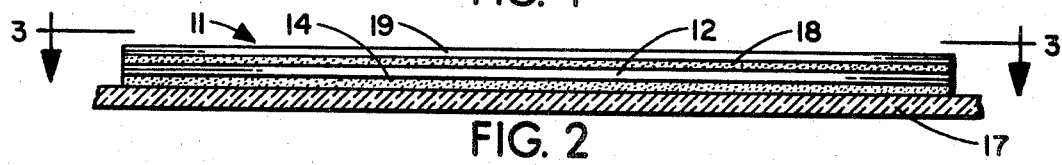
FIG. 2 is a plan view of the display map device as mounted on the interior surface of a motor vehicle window.

Referring now more particularly to the drawing, wherein like reference numerals designate the same or identical parts throughout the several views, and more specifically to FIGS. 1 and 2, there is shown a display map device, generally designated by the reference numeral 11. Display map device 11, as best seen in FIG. 2, includes a base sheet 12 of a material such as a clear, transparent, acrylic plastic preferably about 0.006 inch thick and measuring about 7½ inches in width by about 5 inches in height. An outline map 13 is printed or otherwise suitably depicted on base sheet 12; this map 13 being visible in FIG. 1 through transparent matter overlying the same and more particularly set forth hereinafter. As shown in the drawing, outline map 13 depicts the border configuration of the continental United States of America (Alaska excepted), as well as the border configuration of each of the major political subdivisions thereof; i.e., the 48 States making up this portion of the United States. It is to be clearly understood, however, that the particular map shown in the drawing is depicted solely for the purpose of illustration and not of limitation; and that in lieu thereof another map similarly showing the border configuration of another nation as well as the border configurations of subdivisions thereof could be utilized.

As further shown in FIGS. 1 and 2, the face side, or front surface, of the base sheet of material carrying the outline map 13 is coated with a layer 14 of a conventional and transparent pressure sensitive adhesive or cement. The layer 14 of adhesive is covered, prior to the mounting of map device 11 on an automotive vehicle for use as contemplated herein, by a protective sheet of material 15, shown only in FIG. 1 of the drawing, overlying and adhering to yet readily and easily removeable from contact with the layer 14 of adhesive or cement. The sheet of protective material 15 preferably is a substantially transparent, thin, wax coated paper, and the outline map 13 depicted on the base sheet of material 12 may be viewed through such a sheet of material 15 and the layer 14 of adhesive or cement, as illustrated in FIG. 1 of the drawing. Alternatively, the sheet of protective material 15 could be a thin, opaque paper having a very hard finish.

The base sheet of transparent material 12 carrying the outline map 13 may also carry certain other markings or indicia thereon, as indicated in a general fashion by the circular device 16 placed thereon, visible along with the outline map 13 as hereinbefore set forth and utilizable for the purpose set forth hereinafter.

The map device 11 may be mounted as mentioned hereinbefore by readily and easily lifting a corner of the sheet of protective material 15 from contact with the layer of adhesive 14, as illustrated in FIG. 1, then peeling the sheet 15 completely away from the layer of adhesive 14 and discarding the same, and then by pressing the layer of adhesive 14 firmly into contact with the interior surface of a window 17 of a motor vehicle, as shown in FIG. 2.

Figure 3:
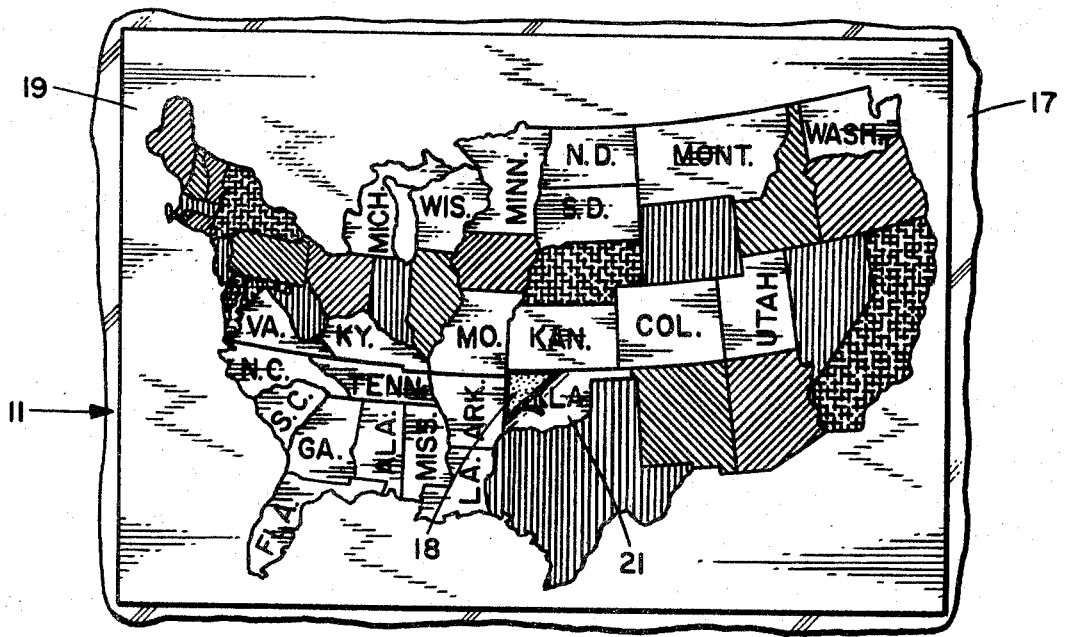
FIG. 3 is an elevational view of the rear surface of the display map device as mounted on the interior surface of a motor vehicle window, taken on the line 3 — 3 of FIG. 2.

Referring now to FIG. 3 as well as to FIG. 2 of the drawing, it will be seen that the rear surface of the base sheet 12 on which outline map 13 is depicted is also coated with a layer 18 of a conventional and transparent pressure sensitive adhesive or cement preferably extending over this entire surface of the base sheet 12, as indicated in the drawing, and extending at least over the entire rear surface of the outline map 13 carried by the base sheet 12. If the entire rear surface of the base sheet 12 is coated with the layer of adhesive 18, then the portion thereof not included within the confines of the outline map 13 is covered with an adhering protective sheet of material 19 having an opening formed therethrough corresponding in size, shape, and positioning to the overall outline or border configuration of the entire area covered by the outline map 13, as indicated in FIG. 3. The portion of the layer 18 of adhesive included within the confines of the outline map 13 is initially covered by a plurality of overlying and adhering protective sheet elements, such as the element 21, readily and easily removeable from contact with the layer 18 of adhesive or cement. Each of the protective sheet elements such as the element 21 corresponds in size, shape, and positioning to one of the designated subdivisions of the area covered by the outline map 13 and is separately removeable from contact with the layer 18 of adhesive or cement, as exemplified in FIG. 3 in the case of element 21. The protective sheet of material 19 and each of the protective sheet elements such as the element 21 are preferably formed of an opaque paper having a very hard finish and are uniformly colored, for instance, blue. Additionally, each of the protective sheet elements such as the element 21 preferably carry on the exterior side thereof directly visible when they are in contact with the layer of adhesive 18 a legend indicating which particular subdivision of the area depicted by the outline map 13 is covered thereby.

Figure 4:
FIG. 4 is a front elevational view of one of the elements attachable to the rear surface of the base sheet carrying the display map and visible therethrough to indicate a visit to a specific portion of the area covered by the map.
Figure 5:
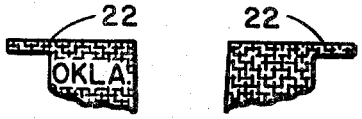
FIG. 5 is a rear elevational view of the element frontally shown in FIG. 4.

Each of the protective sheet elements such as the element 21 are allowed to remain in contact with the layer of adhesive 18 until the user of the map device 11 obtains display elements indicative of the extent of his travels to individually replace the same, as more fully set forth hereinafter. More particularly, one display element 22 for indicating a visit to one particular subdivision of the area encompassed by the outline map 13 is illustrated in FIGS. 4 and 5 of the drawing; the display element 22 being specifically intended to replace the protective sheet element 21 and accordingly being of the same size and shape as the protective sheet element 21. The surface of the display element 22 shown in FIG. 4, which is the surface thereof intended to be pressed into contact with the layer of adhesive 18 when the element 21 has been removed therefrom and discarded, carries a legend identifying the particular outlined subdivision of the area encompassed by the outline map 13 against which it is pressed; this legend being readable through the motor vehicle window 17, the layer of adhesive 14, the base sheet 12 carrying the outline map 13, and the layer of adhesive 18 connecting the base sheet 12 and the element 22. The other surface of the display element 22, as shown in FIG. 5, may, although not shown therein, carry other desired indicia.

Preferably, each of the display elements such as the element 22 are uniformly colored in one of not more than four colors other than the color applied to the protective sheet of material 19 and to the protective sheet elements such as the element 21. Further, each of the display elements such as the element 22 are so colored that, when they are positioned as contemplated herein, adjoining display elements such as the element 22 will not be of the same color.

At this point, it should be noted that the arrangement of the protective sheet elements such as the element 21, as well as the display elements such as the element 22 intended to replace the same, as hereinbefore described, may be modified to some extent when a subdivision of the area covered by the outline map 13 includes two or more sections of land separated by a body of water. For instance, the protective sheet element marked "MICH." illustrated in the drawing may extend over the entire area representing the State of Michigan, the Straits of Mackinac, and Lake Michigan; and may be replaced by a display element of the same size and shape having the portions of the surface thereof intended to be pressed into contact with the layer of adhesive 18 representing Lake Michigan and the Straits of Mackinac colored similarly to the protective sheet of material 19 and the protective sheet elements such as the element 21. The remainder of this surface of this display element, of course, would be contrastingly colored as hereinbefore set forth. Similarly, the protective sheet element marked "VA." illustrated in the drawing and the display element intended to replace the same, inasmuch as the State of Virginia includes two sections of land separated by Chesapeake Bay, would be modified. In such a case, the protective sheet element marked "VA." illustrated in the drawing could extend over the entire area representing the State of Virginia as well as the entire area representing Chesapeake Bay, and could be replaced by a display element of the same size and shape having the portion of the surface thereof intended to be pressed into contact with the layer of adhesive 18 representing Chesapeake Bay colored similarly to the protective sheet of material 19 and the protective elements such as the sheet element 21, with the remainder of this surface of this display element, of course, contrastingly colored as hereinbefore set forth.

If desired, the outline map 13 may be printed or otherwise depicted on the base sheet 12 in the same color that is uniformly applied to the protective sheet of material 19 and each of the protective sheet eements such as the element 21. In such a case, the outline map 13, rather than being initially visible against a contrastingly colored background formed by the protective sheet of material 19 and the protective sheet elements such as the element 21, as illustrated in the drawing, would become visible only as the protective sheet elements such as the element 21 are replaced by the display elements such as the element 22.

The operator of a motor vehicle, having obtained a display map device 11 according to the present invention, may mount the same on, for example, the rear right-hand window of his vehicle as hereinbefore set forth. Then, as he travels in his vehicle throughout the area covered by the outline map 13 of map device 11, in each of the depicted subdivisions of the area covered by outline map 13 he may obtain a display element such as the element 22 representing such subdivision, which are utilized to replace the corresponding protective sheet elements such as the sheet element 21 as hereinbefore set forth. FIG. 3 illustrates the progress of such a motorist who, for example, may reside in one of the New England states and has visited all of the same, and who has begun a motor tour of the United States during which he has additionally sequentially visited Pennsylvania, New Jersey, Delaware, Maryland, West Virginia, Ohio, Indiana, Illinois, Iowa, Nebraska, Wyoming, Idaho, Oregon, Nevada, California, Arizona, New Mexico, Texas, and Oklahoma. FIG. 3 shows that such motorist has mounted on his display map device 11 display elements indicating visits to all of the New England states as well as those specificially mentioned, with the exception of Oklahoma. FIG. 3 further shows the protective sheet element 21 marked "OKLA." being removed for replacement by the display element 22 carrying the legend "OKLA." illustrated in FIGS. 4 and 5 of the drawing. Those States of the United States not yet visited by such motorist, of course, are shown in FIG. 3 with the protective sheet elements such as the element 21 still mounted thereover.

While the display map device 11 according to the present invention may be made available for purchase throughout the area covered by the outline map 13 thereof, and each display element mountable thereon may be made available for purchase in the particular subdivision of such area represented thereby, it is also considered, as mentioned hereinbefore, that the display map device according to the instant invention could also be used for sales promotional purposes by an entity doing business, for example, in all of the political subdivisions of an entire nation. Such an entity might be a major corporation engaged in the marketing of petroleum products necessarily used by all motorists and controlling a number of automotive service stations situated in each of the States of the United States, for example. Such a corporation might make a display map device 11 available without cost at all of its retail outlets to any motorist desiring one, and such display map devices could carry the trademark or advertising of such corporation thereon in the location designated in a general fashion by the circular device 16 shown in the drawing, or at another desired location. Further, at each of the service stations of such corporation located within a particular State, display elements such as the element 22 representing that particular State would be made available without cost. Such a corporation, as well as having its trademark or advertising displayed by motorists together with each display map device 11, could expect such motorists to stop at its service stations as they first visit additional States to obtain the display elements such as the element 22; such stops generally resulting in sales of the products of such corporation.

Obviously, many modifications and variations of the present invention are possible in the light of the foregoing teachings. It is therefore to be understood that within the scope of the appended claims the invention may be practiced otherwise than as specifically disclosed.

What is claimed as new and desired to be secured by Letters Patent of the United States is:

1. A display map device for indicating the extent of the travels of a motorist, comprising:

a base sheet of transparent material carrying depicted thereon an outline map showing the overall border configuration of at least a portion of a nation or the like having a plurality of subdivisions, said outline map further showing the border configurations of said subdivisions;

a first layer of transparent, pressure sensitive adhesive coating the face side of said base sheet carrying said outline map, said first layer of adhesive being adapted to be firmly pressed into contact with the interior surface of a motor vehicle window to mount said display map device on said motor vehicle;

a second layer of transparent, pressure sensitive adhesive coating the reverse side of said base sheet carrying said outline map at least throughout the extent of the total area depicted by said outline map; and a plurality of protective sheet elements overlying and adhering to said second layer of adhesive, each of said protective sheet elements corresponding in size, shape, and positioning to one of said subdivisions depicted by said outline map, each of said protective sheet elements being separately readily removable from contact with said second layer of adhesive to permit a correspondingly sized and shaped display element formed of sheet material having a contrasting surface to be pressed in lieu thereof into contact with said second layer of adhesive to be viewed through said motor vehicle window, said first layer of adhesive, said base sheet, and said second layer of adhesive.

2. The device according to claim 1, wherein said first layer of adhesive is initially protected by an overlying and adhering sheet of protective material readily removeable therefrom prior to the mounting of said display map device on said motor vehicle.

3. The device according to claim 1, wherein said protective sheet elements are uniformly colored, and wherein said outline map is depicted on said base sheet in the same color uniformly applied to said protective sheet elements.

4. The device according to claim 3, wherein said first layer of adhesive is initially protected by an overlying and adhering sheet of protective material readily removeable therefrom prior to the mounting of said display map device on said motor vehicle.

5. A display map device for indicating the extent of the travels of a motorist, comprising:

a base sheet of transparent material carrying depicted thereon an outline map showing the overall border configuration of at least a portion of a nation or the like having a plurality of subdivisions, said outline map further showing the border configurations of said subdivisions;

a first layer of transparent, pressure sensitive adhesive coating the face side of said base sheet carrying said outline map, said first layer of adhesive being adapted to be firmly pressed into contact with the interior surface of a motor vehicle window to mount said display device on said motor vehicle;

a second layer of transparent, pressure sensitive adhesive coating the reverse side of said base sheet carrying said outline map at least throughout the extent of the total area depicted by said outline map;

at least a first display element formed of sheet material pressed into contact with said second layer of adhesive to be viewed through said motor vehicle window, said first layer of adhesive, said base sheet, and said second layer of adhesive, said first display element corresponding in size, shape, and positioning to a first of said subdivisions depicted by said outline map; and a plurality of protective sheet elements each overlying a portion of said second layer of adhesive, each of said protective sheet elements corresponding in size, shape, and positioning to one of said subdivisions depicted by said outline map not covered by a correspondingly sized and shaped display element, each of said protective sheet elements having a surface adhering to said second layer of adhesive contrasting to the surface of any display element useable with said device applicable to said second layer of adhesive, each of said protective sheet elements being separately readily removeable from contact with said second layer of adhesive to permit a correspondingly sized and shaped display element formed of sheet material to be pressed in lieu thereof into contact with said second layer of adhesive to be viewed through said motor vehicle window, said first layer of adhesive, said base sheet, and said second layer of adhesive.

6. The device according to claim 5, wherein said first layer of adhesive is initially protected by an overlying and adhering sheet of protective material readily removeable therefrom prior to the mounting of said display map device on said motor vehicle.

7. The device according to claim 5, wherein said protective sheet elements are uniformly colored, and wherein said outline map is depicted on said base sheet in the same color uniformly applied to said protective sheet elements.

8. The device according to claim 7, wherein said first layer of adhesive is initially protected by an overlying and adhering sheet of protective material readily removeable therefrom prior to the mounting of said display map device on said motor vehicle.

* * * * *